(12) United States Patent
Li

(10) Patent No.: US 8,331,043 B2
(45) Date of Patent: Dec. 11, 2012

(54) OPTICAL LENS

(75) Inventor: Jiaying Li, Shenzhen (CN)

(73) Assignee: Han's Laser Technology Co., Ltd., Shenzhen (CN)

( * ) Notice: Subject to any disclaimer, the term of this patent is extended or adjusted under 35 U.S.C. 154(b) by 120 days.

(21) Appl. No.: 12/914,326

(22) Filed: Oct. 28, 2010

(65) Prior Publication Data

US 2011/0096405 A1    Apr. 28, 2011

Related U.S. Application Data

(63) Continuation of application No. PCT/CN2009/070882, filed on Mar. 19, 2009.

(30) Foreign Application Priority Data

Apr. 28, 2008    (CN) .......................... 2008 1 0066903

(51) Int. Cl.
*G02B 9/12* (2006.01)
*G02B 13/04* (2006.01)
(52) U.S. Cl. ....................................... 359/784; 359/753
(58) Field of Classification Search ................. 359/662, 359/749–753, 781–784
See application file for complete search history.

(56) References Cited

U.S. PATENT DOCUMENTS

| | | | |
|---|---|---|---|
| 3,731,989 A * | 5/1973 | Shimizu ........................ 359/753 |
| 4,217,034 A * | 8/1980 | Sugiyama ..................... 359/739 |
| 4,400,063 A | 8/1983 | Hayashida |
| 4,787,723 A | 11/1988 | Uetake |
| 4,880,299 A | 11/1989 | Hamada |
| 5,136,412 A | 8/1992 | Makino |
| 5,633,736 A | 5/1997 | Griffith et al. |
| 5,917,663 A * | 6/1999 | Suzuki .......................... 359/749 |
| 6,781,768 B2 | 8/2004 | Minefuji |
| 7,715,118 B2 * | 5/2010 | Kato ............................. 359/754 |
| 7,924,510 B2 * | 4/2011 | Kobayashi ..................... 359/781 |
| 2001/0040734 A1 | 11/2001 | Nakai |
| 2005/0195493 A1 | 9/2005 | Nishina et al. |
| 2011/0038062 A1 | 2/2011 | Li |
| 2011/0043931 A1 | 2/2011 | Li |

(Continued)

FOREIGN PATENT DOCUMENTS

CN    2585256    11/2003
(Continued)

OTHER PUBLICATIONS

Co-pending U.S. Appl. No. 12/914,395, filed Oct. 28, 2010.
(Continued)

*Primary Examiner* — Jordan Schwartz
(74) *Attorney, Agent, or Firm* — Hamre, Schumann, Mueller & Larson, P.C.

(57) ABSTRACT

An optical lens includes a lens group and a diaphragm which is located in front of the lens group. The lens group includes three lenses, respectively the first, the second and the third lens, which are sequentially arranged as a "negative-positive-positive" separated focal power system. The first lens is a double concave negative lens, the second lens is a positive meniscus lens, and the third lens is a double convex positive lens. A concave surface of the second lens is towards the diaphragm, and the focal length of the entire optical system is f, the focal lengths of the first, the second and the third lens are respectively f1, f2, and f3, and which satisfies the following requirement: $-0.7 < f1/f < -0.5$; $1.0 < f2/f < 1.3$; $0.8 < f3/f < 1.0$.

4 Claims, 12 Drawing Sheets

U.S. PATENT DOCUMENTS

2011/0102904 A1    5/2011    Li

FOREIGN PATENT DOCUMENTS

| | | |
|---|---|---|
| CN | 101324696 | 12/2008 |
| CN | 101369046 | 2/2009 |
| CN | 101369047 | 2/2009 |
| JP | 56-135815 | 10/1981 |
| JP | 61-286810 | 12/1986 |
| JP | 62-200314 | 9/1987 |
| JP | 62-254110 | 11/1987 |
| JP | 63-104009 | 5/1988 |
| JP | 63-267910 | 11/1988 |
| JP | 2-52307 | 2/1990 |
| JP | 4-97211 | 3/1992 |
| JP | 6-109995 | 4/1994 |
| JP | 8-15606 | 1/1996 |
| JP | 9-90216 | 4/1997 |
| JP | 10-39205 | 2/1998 |

OTHER PUBLICATIONS

Co-pending U.S. Appl. No. 12/914,576, filed Oct. 28, 2010.
Co-pending U.S. Appl. No. 12/914,674, filed Oct. 28, 2010.

* cited by examiner

OPTICAL LENS

This application is being filed as a PCT International Patent Application in the name of HAN'S LASER TECHNOLOGY CO., LTD and claims the benefit of Chinese Patent Application No. 200810066903.4, filed Apr. 28, 2008, which is herein incorporated by reference in the entirety.

TECHNICAL FIELD

The present invention relates to the field of laser machining, in particular, to an optical lens.

BACKGROUND

Nowadays, application of laser is deeply engaged in every aspect of the modern life of human beings. In the application of laser, various applied optical systems required for meeting the demands of various processes are indispensable. Presently, the laser marking machine existing in the market are gradually replacing various ink writers, screen printers and the like due to the characteristics of its fast speed, great flexibility, needing no consumables, permanent marking and so on.

The F-theta (fθ) lens is a kind of photographic objective lens that has a large field of view, medium and small-sized aperture, and medium and long-sized focal length. Choosing a photographic objective lens with the "three-piece" type must be relatively suitable concerning the parameters it is to possess. The flat-field optical lens for laser scanning is called the fθ lens, and this lens achieves that, when the laser beam is scanning at a constant angular velocity, the focusing point of the light beam transmitting through this lens on the image plane is also moving at a uniform speed, which determines that scanning angle of the light beam and image height of the focusing point on the image plane will establish a linear relationship. A galvanometer laser marking machine is realized due to the present of the fθ lens.

FIG. 1 is a typical fθ lens optical system provided in the conventional art, in which the light beam is reflected by a reflector that is scanning at an angular velocity rotating at a uniform speed, then focused on the image plane by the fθ lens, that is, the light beam sequentially passes two galvanometers 1 and 2 that are respectively rotating about the x-axis and the y-axis, and at last passes through the fθ lens 3 and is focused on the image plane 4, so as to form an image by scanning with the galvanometer. The fθ lens 3 is a flat-field focusing lens. It is required that image height η on the image plane has a linear relationship with the scanning angle θ of the X galvanometer 1 and the Y galvanometer 2 upon marking, that is, $\eta=f*\theta(Sr)$, wherein, assuming that incident angle of light with respect to the fθ lens at a certain point of time is θ, the image height of the generated image with respect to the center point is η, then there must exist a linear relationship therebetween, that is, $\eta=k*f*\theta$. Wherein, k is a constant; f is the focal length of the fθ lens, which is a fixed value for a particular lens; and θ is the scanning angle of the galvanometer (in radians).

According to the theory of Gauss optical imaging, it is known that the image height η has a following relationship with the focal length f of the lens and the angle of rotation θ of the light beam: $\eta=f*tg\theta$. However, normally, there is always a certain distortion in an imaging system. Assuming that in the aberration correction of the optical design a distortion Δη is intentionally introduced in, so as to satisfy the relationship as shown in the formula below: $\eta=f*tg\theta-\Delta\eta=k*f*\theta$, then the requirement that the object-image relationship of the fθ lens is a linear relationship may be achieved. Therefore, it is derived that $\Delta\eta=f*tg\theta-k*f*\theta=f(tg\theta-k*\theta)$ wherein Δη is a positive value, and the fθ lens is an optical system with a negative distortion. Therefore, it is required that the system has a relatively large negative distortion when the angle is relatively large.

Meanwhile, the diaphragm of the fθ lens which is outside of the lens is a typical non-symmetrical optical system. When issue of the balance of the vertical aberration is concerned in the design of the existing products, generally, the design is carried out by adopting the symmetrical structure of Pitzval, so as to achieve the correction of the vertical aberration. However, on the contrary, it is very difficult to correct the vertical aberration very well by adopting the symmetrical structure of Pitzval, to design this kind of non-symmetrical optical system.

In addition, another feature of the fθ lens is to require that all the focus points within the range of imaging must have a similar quality of focusing and no vignetting is allowed, so as to assure that all the image points are consistent. Sometimes the energy density of the laser is very large, in order to increase the service life of the lens, it is required to adopt no cemented lens when it is used in a laser applied light path.

SUMMARY

Technical Problem

An aspect of the present invention is to provide a miniaturized optical lens, which has a large lens incident light aperture, a medium and small-sized focal length and is capable of exchanging with the existing lens mouting size.

Technical Solution

The technical solution adopted in the present invention is to provide an optical lens, which comprises a lens group and a diaphragm, the diaphragm is located in front of the lens group. The lens group comprises three lenses, respectively the first, the second and the third lens, which are sequentially arranged as a "negative-positive-positive" separated focal power system, wherein, the first lens is a double concave negative lens, the second lens is a positive meniscus lens, and the third lens is a double convex positive lens. Both of the curved surfaces of the second lens are bent in the direction towards the diaphragm, and the focal length of the entire optical system is f, the focal lengths of the first, the second and the third lens are respectively f1, f2, and f3, and the ratio between the focal length of each lens and the focal length f of the entire optical system satisfies the following requirement:

$-0.7<f1/f<-0.5$ $1.0<f2/f<1.3$ $0.8<f3/f<1.0$

Advantageous Effect

The optical lens provided in the embodiments of the present invention adopts a lens group comprising a double concave negative lens, a positive meniscus lens, and a double convex positive lens arranged in sequence, so as to make the spherical aberration, the image aberration and the curvature of field of the system all achieve a better balance, to make the result of imaging well and to make the imaging uniform all over the image plane. Moreover, the structure upon being applied to the fθ lens with a large aperture incidence achieves a comparatively good result in respect of miniaturization and is capable of exchanging with the existing lens mouting size. In the meanwhile, in case that the total number of the lenses remains three pieces, the aperture, the image aberration, the spherical aberration, and the astigmatism are relatively better balanced.

DETAILED DESCRIPTION OF THE PREFERRED EMBODIMENTS

The present invention is further explained in combination with the accompanying drawings and the specific embodiments thereof as follows.

The fθ lens is a kind of photographic objective lens that has a large field of view, medium and small-sized aperture, and medium and long-sized focal length. Choosing a photographic objective lens with the "three-piece" type will be relatively suitable concerning the parameters it is to possess. A "negative-positive-positive" separated focal power system is adopted herein for the design, and the distortion generated by the entrance pupil thereof outside of the lens is needed by the fθ lens. The distortion may easily meet the requirement of the fθ lens and is a kind of "non-deformed" marking. Meanwhile, it is a photographic objective lens with a large field of view. It is an objective lens that has a flat image field similar to the photographic objective lens.

Figure 1:
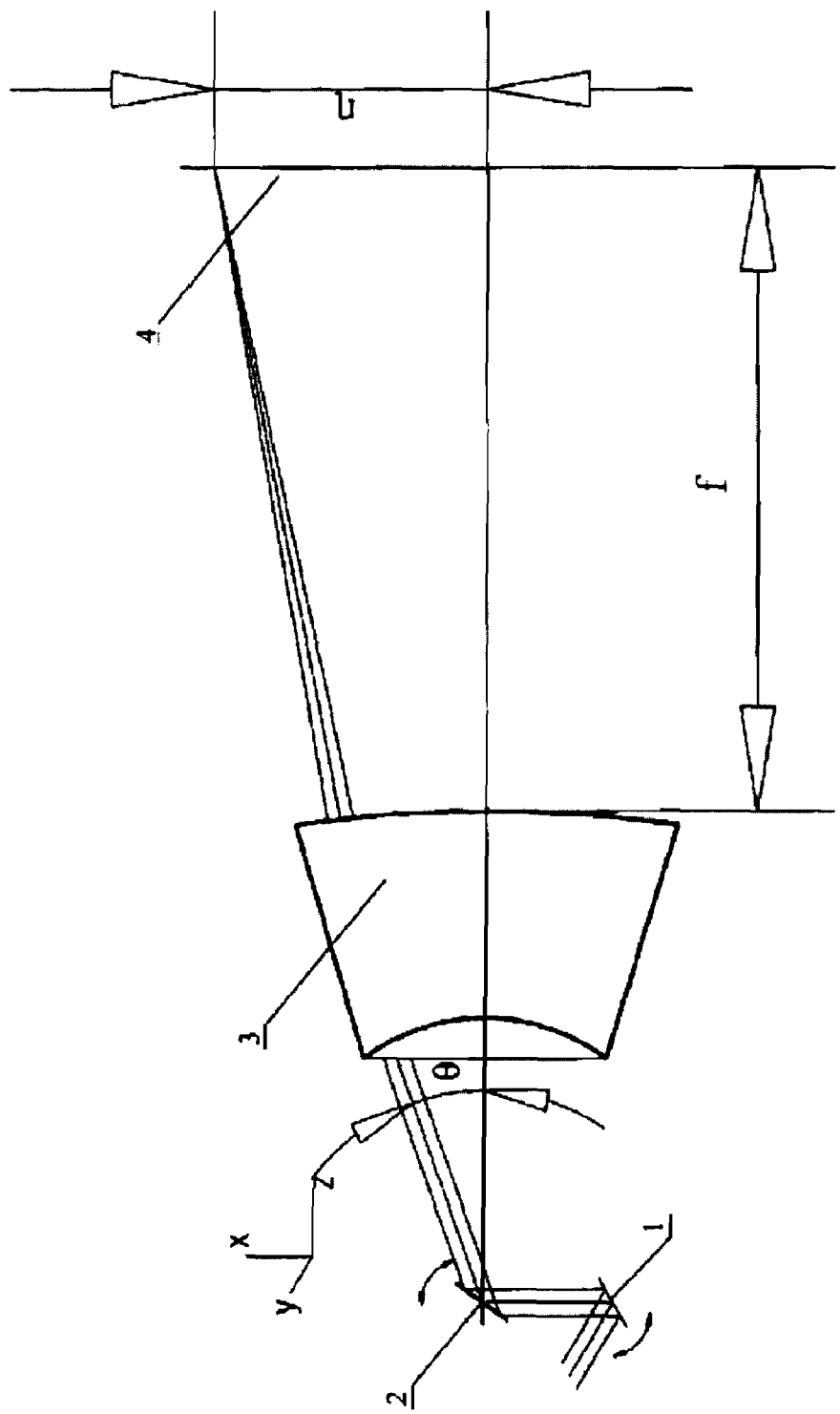
FIG. 1 is a schematic view of a typical fθ lens optical system provided in the conventional art.
Figure 2:
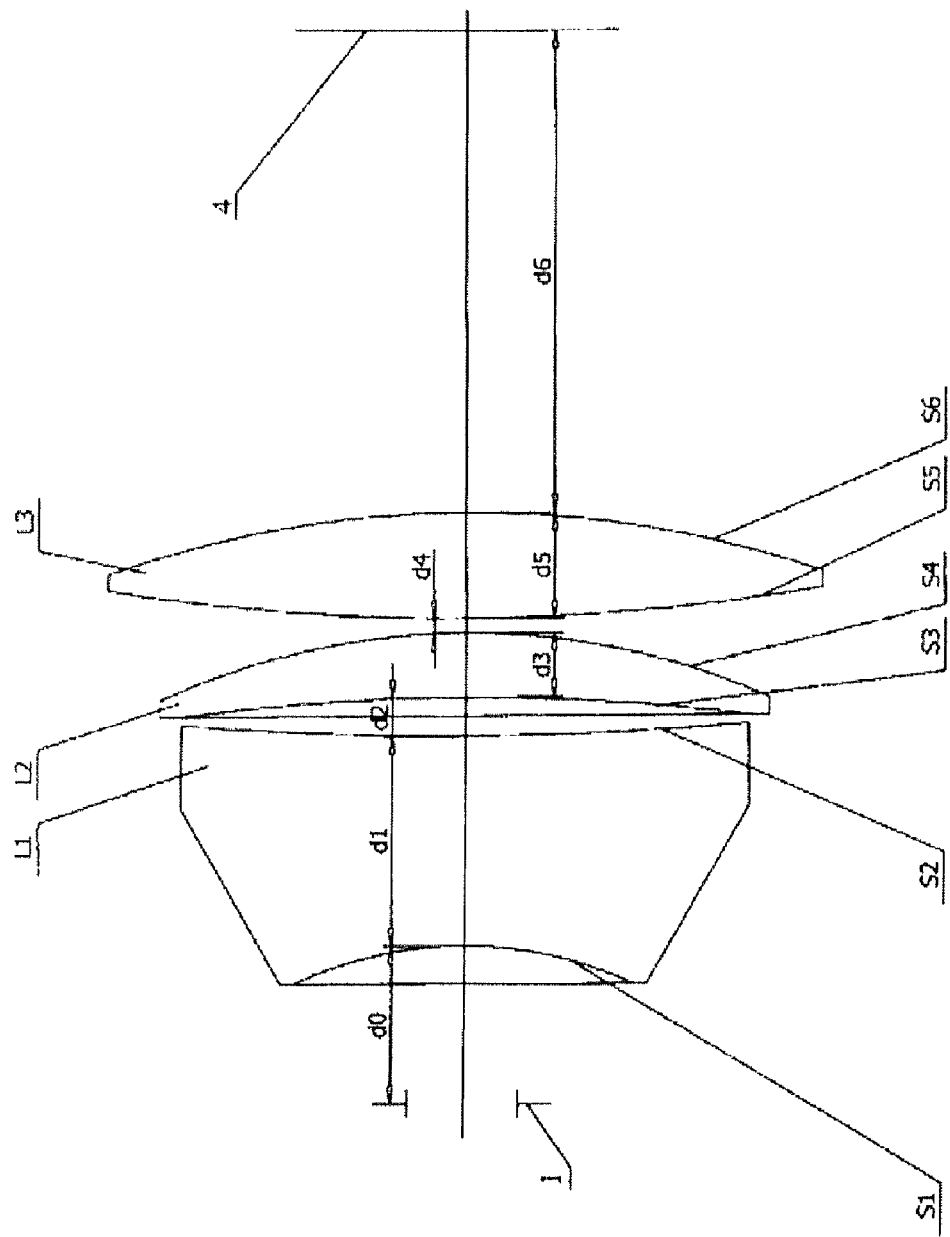
FIG. 2 is a schematic and structural view of an optical lens provided in an embodiment of the present invention.

As shown in FIG. 2, a three-piece "negative-positive-positive" focal power distribution is adopted in the present invention, which comprises a lens group and a diaphragm (galvanometer) which is located in front of the lens group. The lens group comprises three lenses, respectively the first, the second and the third lens L1, L2 and L3, wherein the focal power of the first lens 1/f1 is negative, the thickness thereof is about 30 mm. Since the first lens is a thick lens, in case that the total number of the lenses is three pieces, the aperture, the high-level spherical aberration, and the astigmatism are relatively better balanced. The focal power of the second lens 1/f2 and that of the third lens 1/f3 are both positive, wherein the ratio between the focal length of each lens and the focal length f of the entire optical system satisfies the following requirement:

$$-0.7 < f1/f < -0.5$$

$$1.0 < f2/f < 1.3$$

$$0.8 < f3/f < 1.0$$

wherein, the focal length of the entire optical system is f, and the focal lengths of the first, the second and the third lens are respectively f1, f2, and f3.

Wherein, the distance d0 of the first lens L1 from the diaphragm (galvanometer) 1 is 25-60 mm, the first lens L1 is a double concave negative thick lens, the second lens L2 is a positive meniscus lens. Both of the curved surfaces of the second lens L2 are bent in the direction towards the diaphragm (galvanometer) 1. The third lens L3 is a double convex positive lens, and the distance of the third lens L3 from the focal plane 4 is d6.

Sometimes an optical window composed of parallel flat boards is added at any position in the light exiting direction of the lens group for protecting the outwardly exposed lens or for any other purpose when the above lens group is put into practice. The addition of the optical window under the above parameter conditions is covered within the concept of the present invention.

The beneficial effect achieved by adopting the above design is as follows. The first negative lens L1 adopts a thick lens, which facilitates the reduction of the size of the lens in a diameter direction, so as to make the lens achieve a mouting size that is the same as the small beam diameter lens in case that the diameter of the incident beam is relatively large, thus facilitating the standardization of the lens mounting size. A relatively large distortion is achieved by means of a non-symmetrical structure, and the limitation that the distortion is relatively small with a symmetrical structure is overcome, such that the design may very easily satisfy the requirement that object-image relationship is linear, and the non-symmetrical aberration is also very well corrected. A separated lens system is adopted without any cemented interface, thus the influences caused by aging of the glue or damage by the laser when used in a strong laser applied optical path are avoided, so the stability and service life of the lens are improved. Meanwhile, various aberrations affecting the imaging quality are relatively better corrected simply by adopting a three-piece separated lens, thus the cost of the lens is greatly reduced.

The specific structure and parameters thereof are expressed as follows:

The system comprises three lenses L1, L2 and L3, the lens L1 is composed of two curved surfaces S1 and S2 which are respectively with the curvature radius of R1 and R2, the center thickness thereof is d1, and the optical parameter of the material is Nd1:Vd1; the lens L2 is composed of two curved surfaces S3 and S4 which are respectively with the curvature radius of R3 and R4, the center thickness thereof is d3, the optical parameter of the material is Nd3:Vd3; the lens L3 is composed of two curved surfaces S5 and S6 which are respectively with the curvature radius of R5 and R6, the center thickness thereof is d5, and the optical parameter of the material is Nd5:Vd5; the interval between the first lens L1 and the second lens L2 is d2, and the interval between the second lens L2 and the third lens L3 is d4.

With the above parameters, two groups of lens are devised according to the present invention, the specific parameters thereof are respectively as shown below:

Example 1

The first lens L1 is composed of two curved surfaces S1 and S2 which are respectively with the curvature radius of R1=−56.116 mm and R2=776.87 mm, the center thickness d1 thereof on the optical axis is equal to 30 mm, the optical parameters of the material Nd1:Vd1 is about 1.52/64; the second lens L2 is composed of two curved surfaces S3 and S4 which are respectively with the curvature radius of R3=−361.22 mm and R4=−102.494 mm, the center thickness d3 thereof on the optical axis is equal to 9 mm, the optical parameter of the material Nd3:Vd3 is about 1.8/25.4; the third lens L3 is composed of two curved surfaces S5 and S6 which are respectively with the curvature radius of R5=339.46 and R6=−175.248 mm, the center thickness d5 thereof on the optical axis is equal to 6 mm, the optical parameter of the material Nd5:Vd5 is about 1.8/25.4; the interval d2 between the first lens L1 and the second lens L2 on the optical axis is equal to 6 mm, the interval d4 between the second lens L2 and the third lens L3 on the optical axis is equal to 0.2 mm, and the distance d6 of the third lens L3 from the image plane on the optical axis is equal to 213.5 mm. The above parameters are listed as follows:

| Lens No. | Curved surface No. | Curvature R (mm) | Surface interval d (mm) | Material Nd:Vd |
|---|---|---|---|---|
| L1 | S1 | −56.116 | 30 | 1.52/64 |
|    | S2 | 776.87 | 6 | |
| L2 | S3 | −361.22 | 9.2 | 1.8/25.4 |
|    | S4 | −102.494 | 0.2 | |
| L3 | S5 | 339.46 | 15 | 1.8/25.4 |
|    | S6 | −175.248 | 213.5 | |

According to the above table, the following data may be derived:
f=164.3 mm, D/f=1:8
λ=1064 nm, 2ω=50°
f1/f=−0.62, f2/f=1.11, f3/f=0.92

Thus f1/f=−0.62 satisfies −0.7<f1/f<−0.5, f2/f=1.11 satisfies 1.0<f2/f<1.3 and f3/f=0.92 satisfies 0.8<f3/f<1.0.

Figure 3:
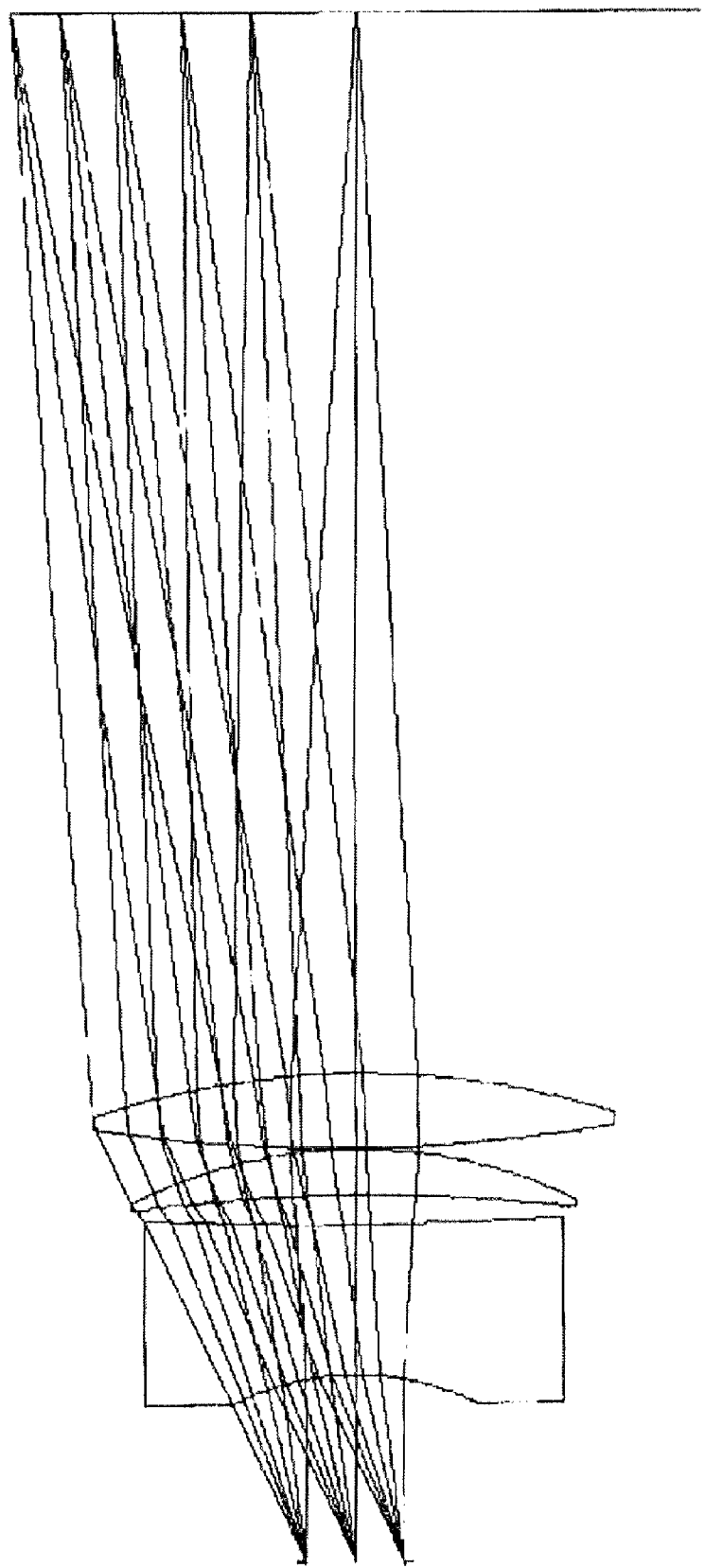
FIG. 3 is a light trace diagram of an optical lens provided in a first embodiment of the present invention.
Figure 4:
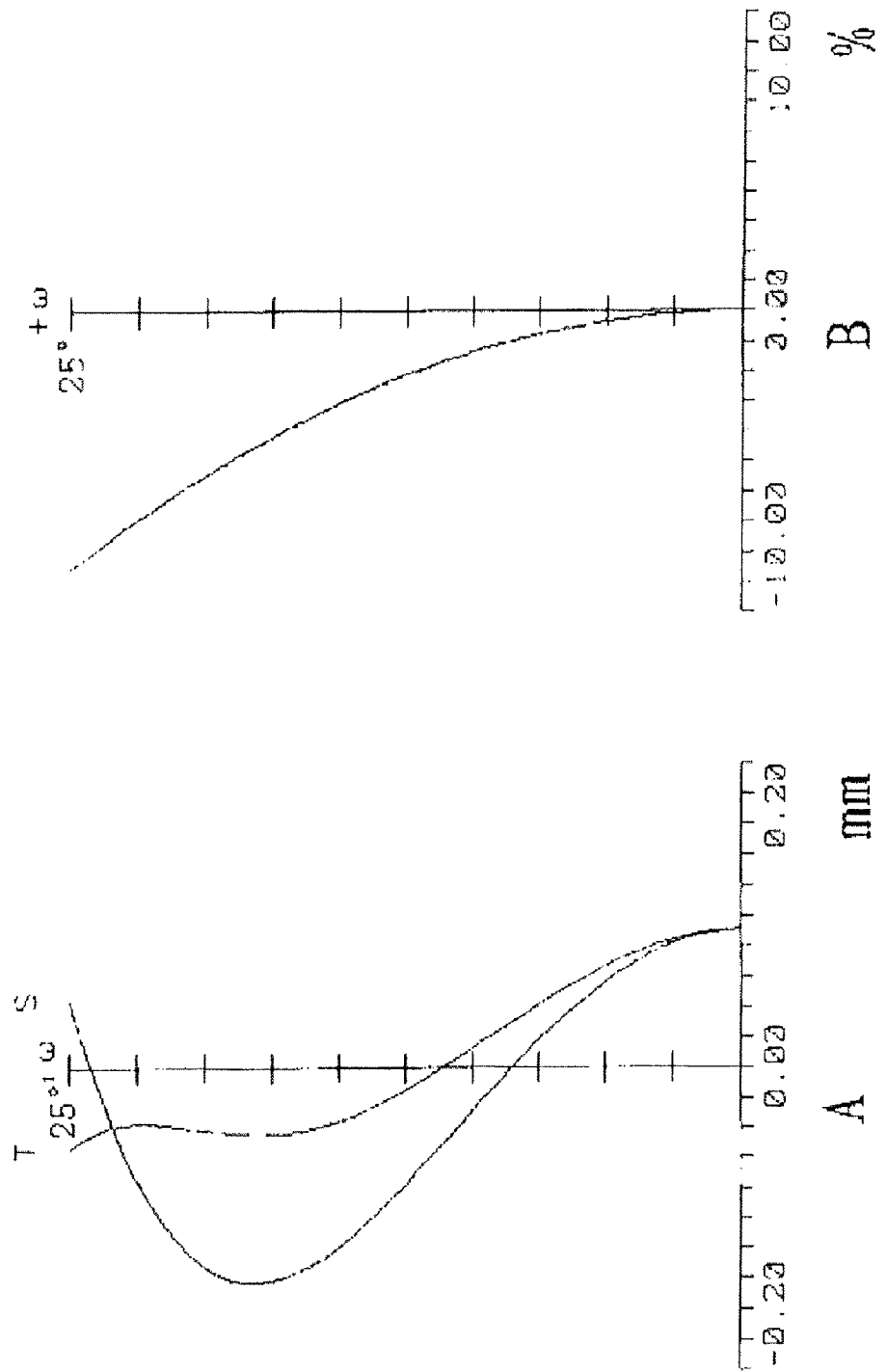
FIG. 4 is a distribution diagram of astigmatism, curvature of field and distortion of the optical lens provided in the first embodiment of the present invention.
Figure 5:
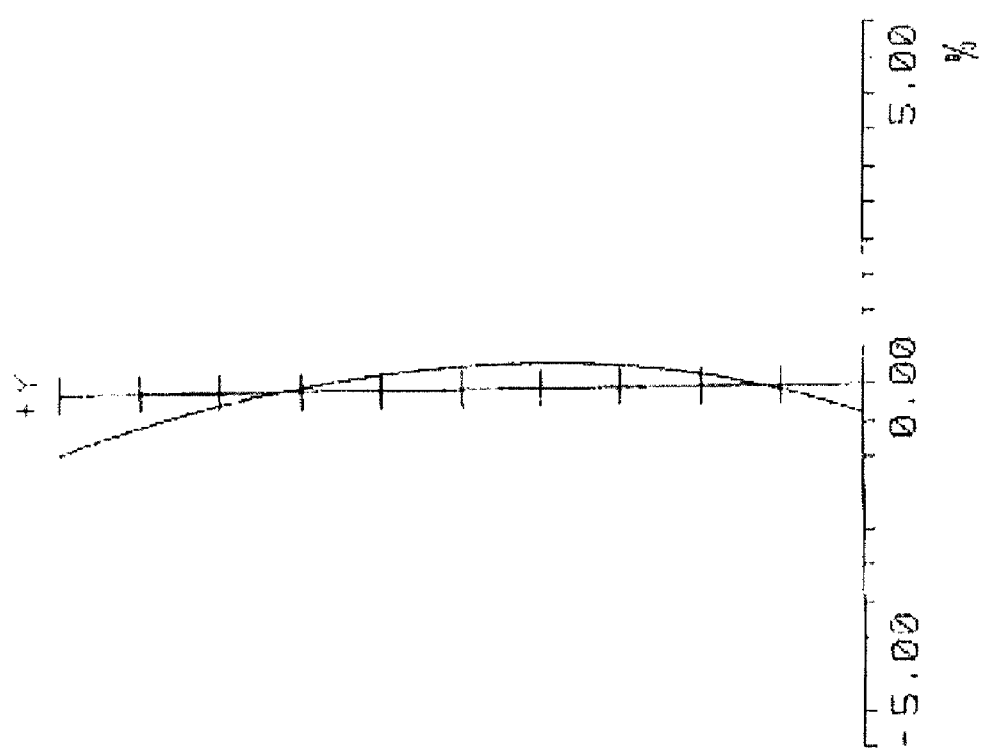
FIG. 5 is a curve distribution diagram of linearity difference of the optical lens provided in the first embodiment of the present invention.
Figure 6:
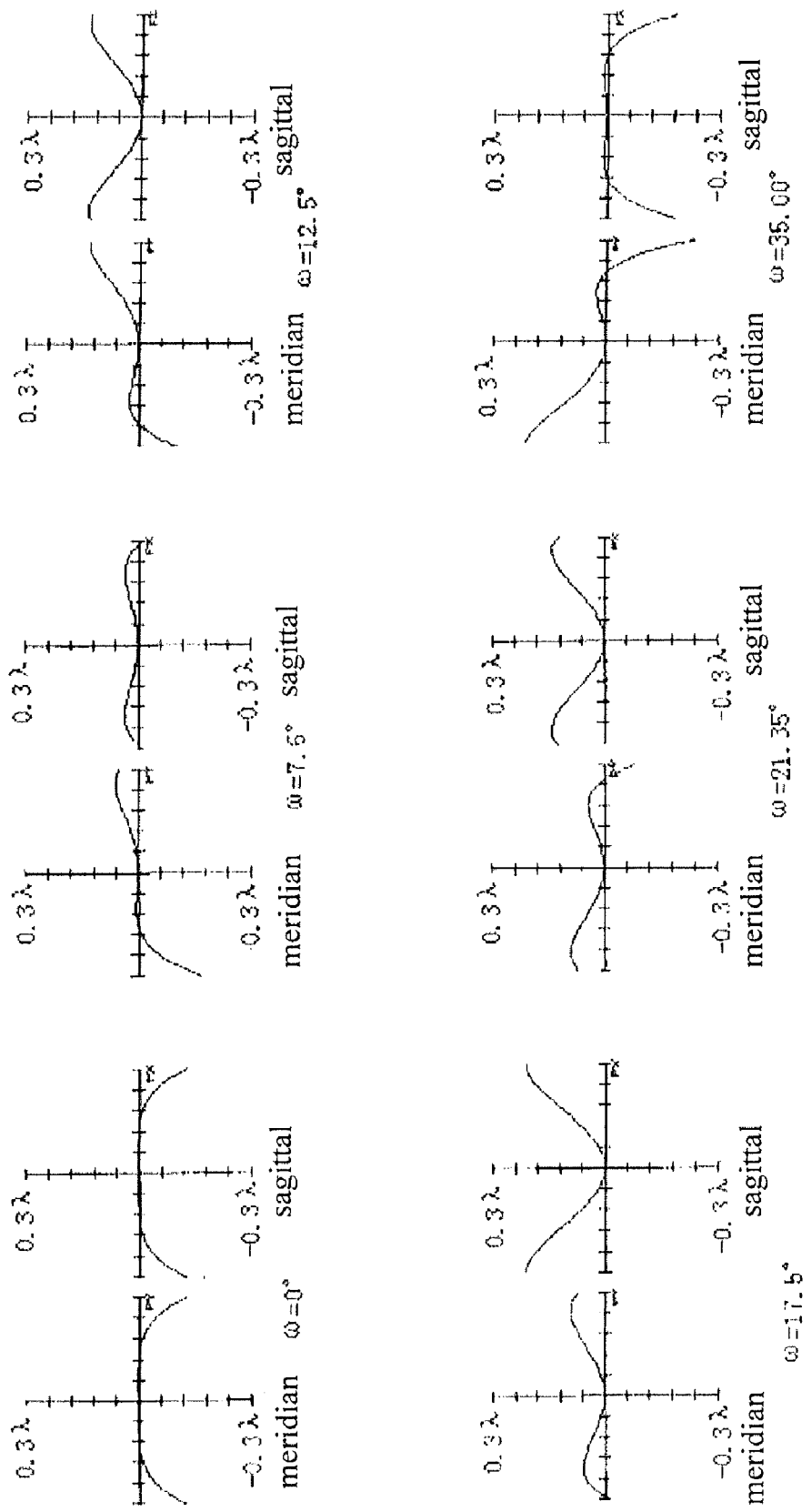
FIG. 6 is a curve distribution diagram of light path difference of the optical lens provided in the first embodiment of the present invention when the field of view thereof is respectively 0, 0.3, 0.5, 0.7, 0.85 and 0.1.
Figure 7:
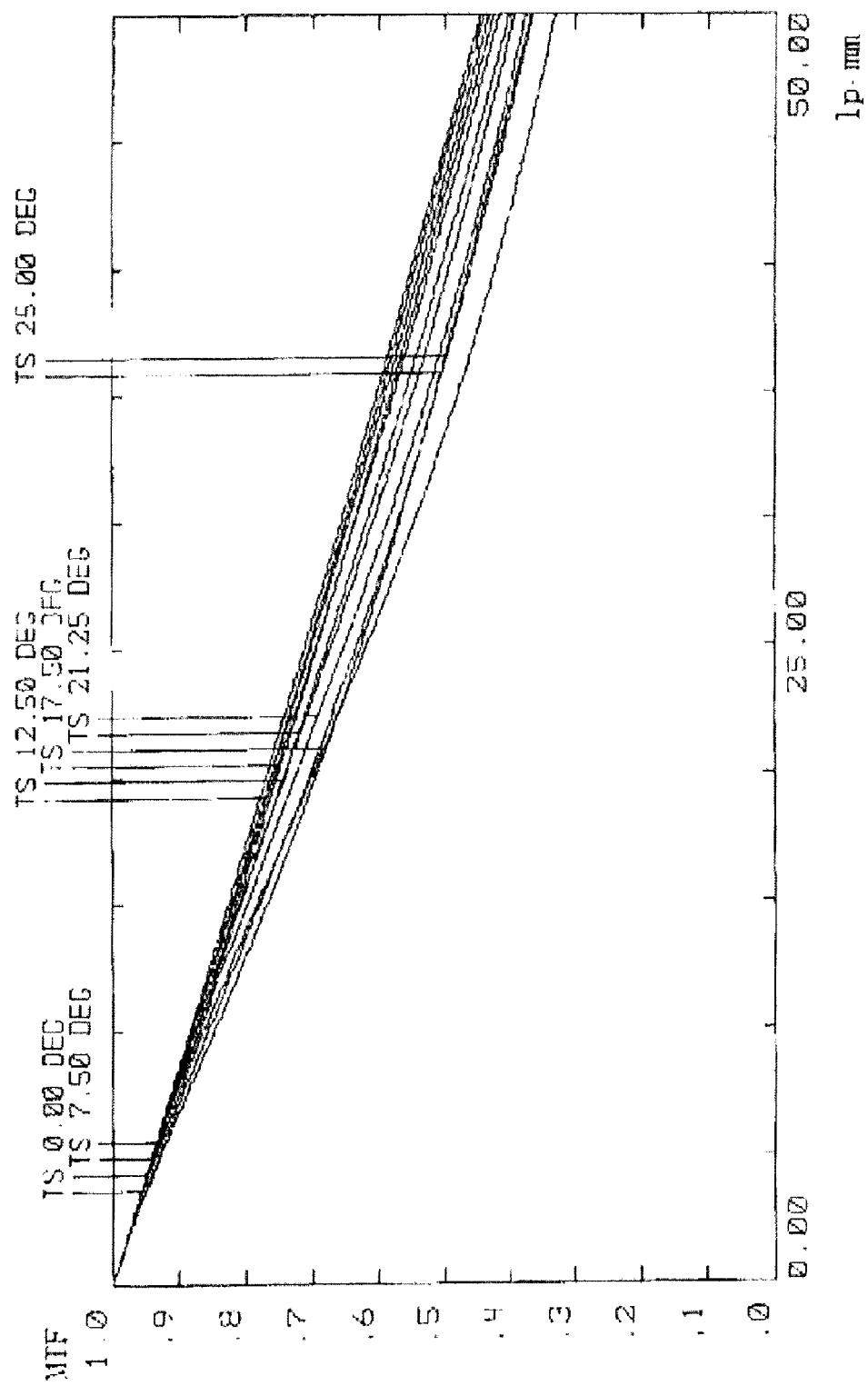
FIG. 7 is an MTF distribution diagram of optical transfer function of an optical lens provided in a second embodiment of the present invention.

FIG. 3 is a light trace diagram of a first embodiment, illustrating the layout of the lens of the product of this embodiment. FIG. 4 is a distribution diagram of astigmatism, curvature of field and distortion (A is the distribution diagram of the astigmatism and the curvature of field, B is the distribution diagram of the distribution), it is seen that the astigmatism and the curvature of field of the system of this embodiment are very well corrected, as shown in the figure. FIG. 5 is a curve distribution diagram of linearity difference, linear error of the system is at maximum within ±0.5%, thus the equation of the object-image relationship of the F-theta lens is relatively better realized. FIG. 6 is a light path difference diagram when the field of view is respectively 0, 0.3, 0.5, 0.7, 0.85 and 0.1, the light path difference is at maximum not larger than ±0.3λ, showing that the aberration of the system of this embodiment is relatively better corrected. FIG. 7 is an MTF distribution diagram of the optical transfer function, from which it is seen that the MTF value of each field of view is relatively consistent, showing that the imaging over all field of view is uniform.

It is shown from each of the above figures that: the astigmatism and the curvature of field of the system are very well corrected, the light path difference is at maximum not larger than ±0.3λ, and according to the MTF distribution diagram of the optical transfer function, the MTF value of each field of view is relatively consistent, showing that the imaging over all field of view is uniform with no vignetting, moreover, the incident beam aperture is relatively large in the system, and a structure in a form different from the general fθ optical system is adopted, so as to make the product of this system capable of being exchanged with a general product having a small incident beam aperture, thereby achieving a miniaturized design, and the product is capable of exchanging with the existing lens mouting size. In the meanwhile, in case that the total number of the lenses remains three pieces, the aperture, the image aberration, the spherical aberration, and the astigmatism are relatively better balanced.

Example 2

The first lens L1 is composed of two curved surfaces S1 and S2 which are respectively with the curvature radius of R1=−64.893 mm and R2=∞, the center thickness d1 thereof on the optical axis is equal to 30 mm, the optical parameters of the material Nd1:Vd1 is about 1.52/64.2; the second lens L2 is composed of two curved surfaces S3 and S4 which are respectively with the curvature radius of R3=−350.291 mm and R4=−133.167 mm, the center thickness d3 thereof on the optical axis is equal to 13 mm, the optical parameter of the material Nd3:Vd3 is about 1.8/25.4; the third lens L3 is composed of two curved surfaces S5 and S6 which are respectively with the curvature radius of R5=516.318 mm and R6=−216.346 mm, the center thickness d5 thereof on the optical axis is equal to 6 mm, the optical parameter of the material Nd5:Vd5 is about 1.81/25.4; the interval d2 between the first lens L1 and the second lens L2 on the optical axis is equal to 6 mm, the interval d4 between the second lens L2 and the third lens L3 on the optical axis is equal to 0.5 mm, and the distance d6 of the third lens L3 from the image plane on the optical axis is equal to 268 mm. The above parameters are listed as follows:

| Lens No. | Curved surface No. | Curvature R (mm) | Surface interval d (mm) | Material Nd:Vd |
|---|---|---|---|---|
| L1 | S1 | −64.893 | 30 | 1.52/64.2 |
|    | S2 | ∞ | 6 | |
| L2 | S3 | −350.291 | 13 | 1.81/25.4 |
|    | S4 | −133.167 | 0.5 | |
| L3 | S5 | 516.318 | 16 | 1.81/25.4 |
|    | S6 | −216.346 | 268 | |

According to the above table, the following data may be derived:
f=209.7 mm, D/f=1:10
λ=1064 nm, 2ω=50°
f1/f=−0.61, f2/f=1.01, f3/f=0.94

Figure 8:
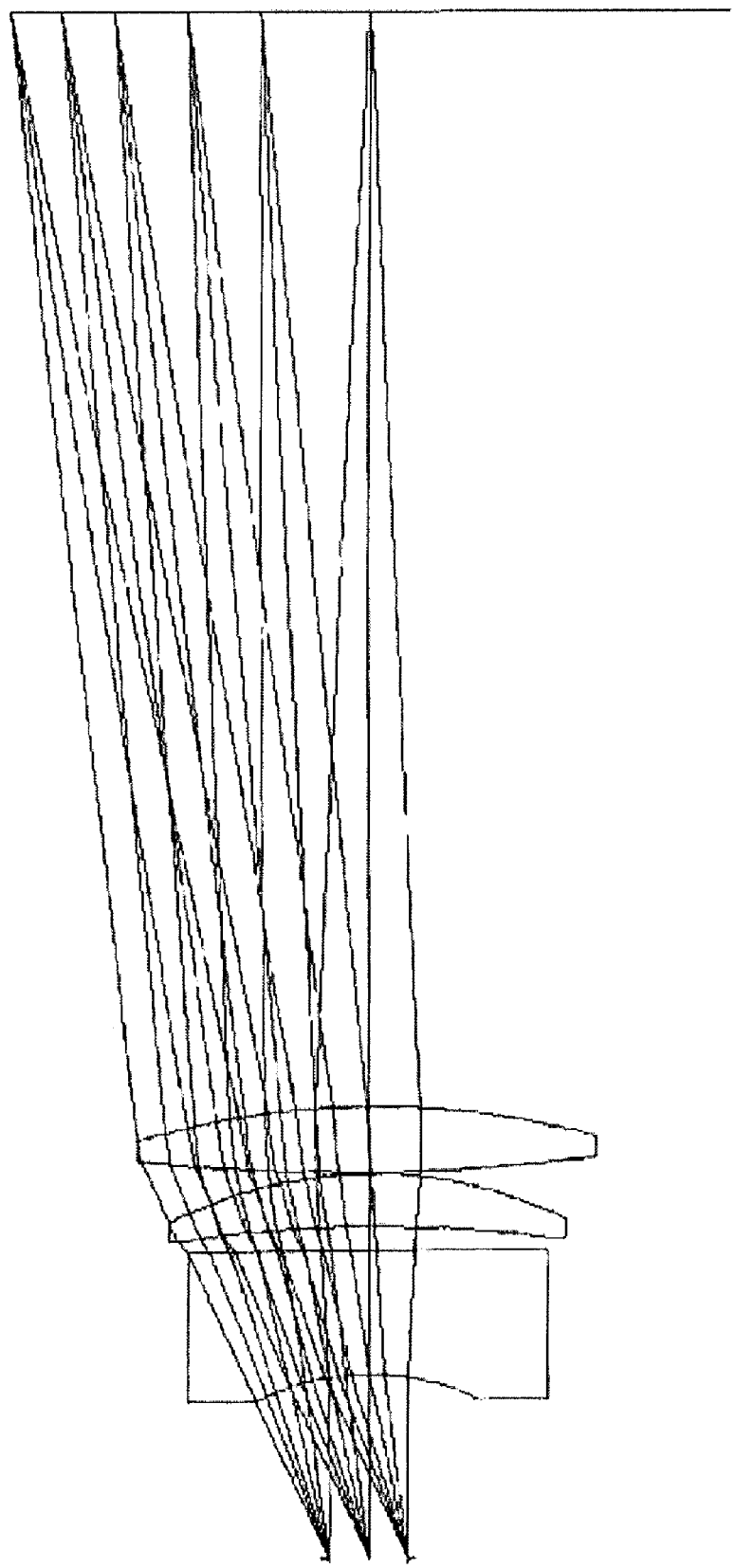
FIG. 8 is a light trace diagram of the optical lens provided in the second embodiment of the present invention.
Figure 9:
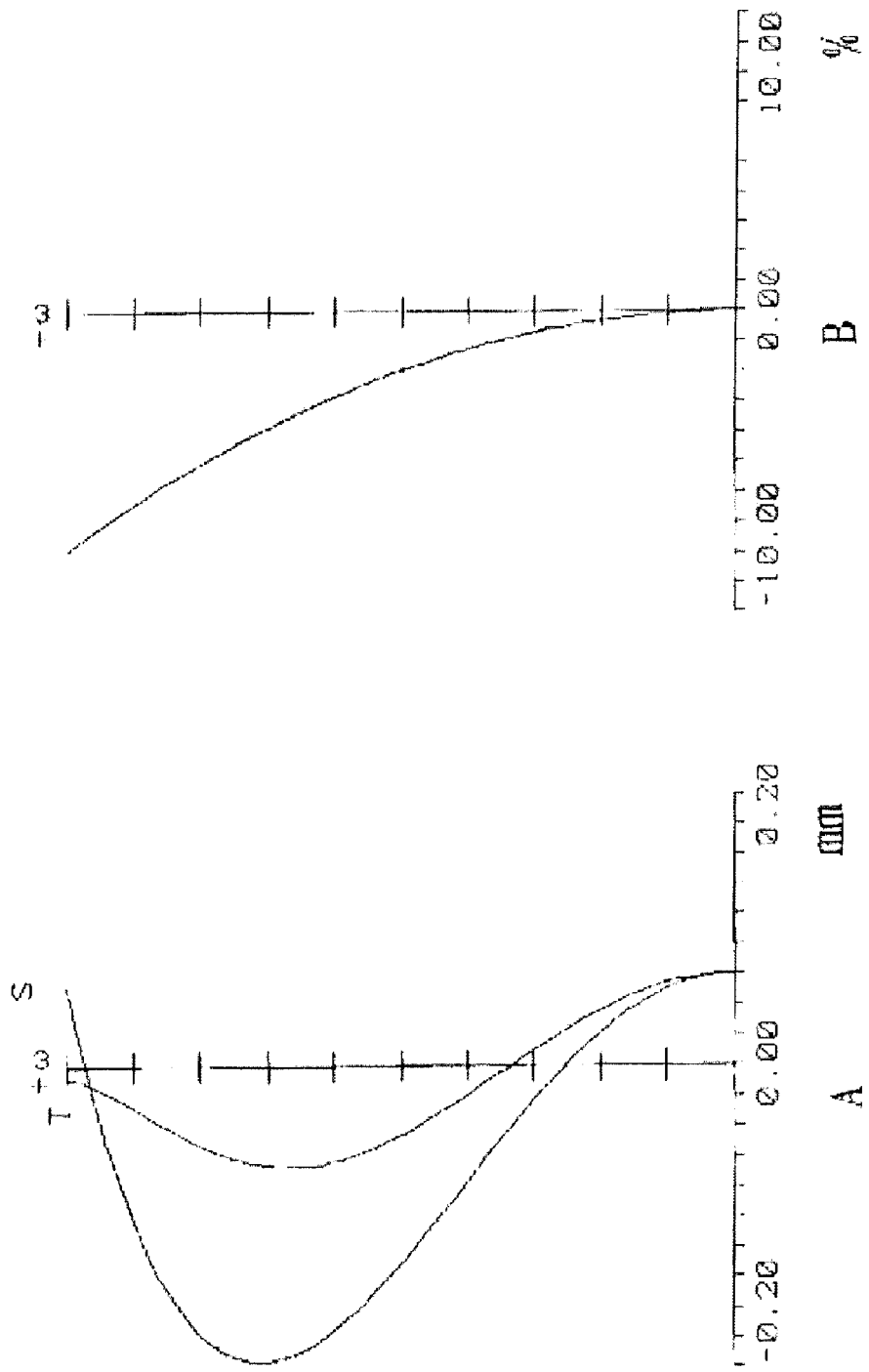
FIG. 9 is a distribution diagram of the astigmatism, the curvature of field and the distortion of the optical lens provided in the second embodiment of the present invention.
Figure 10:
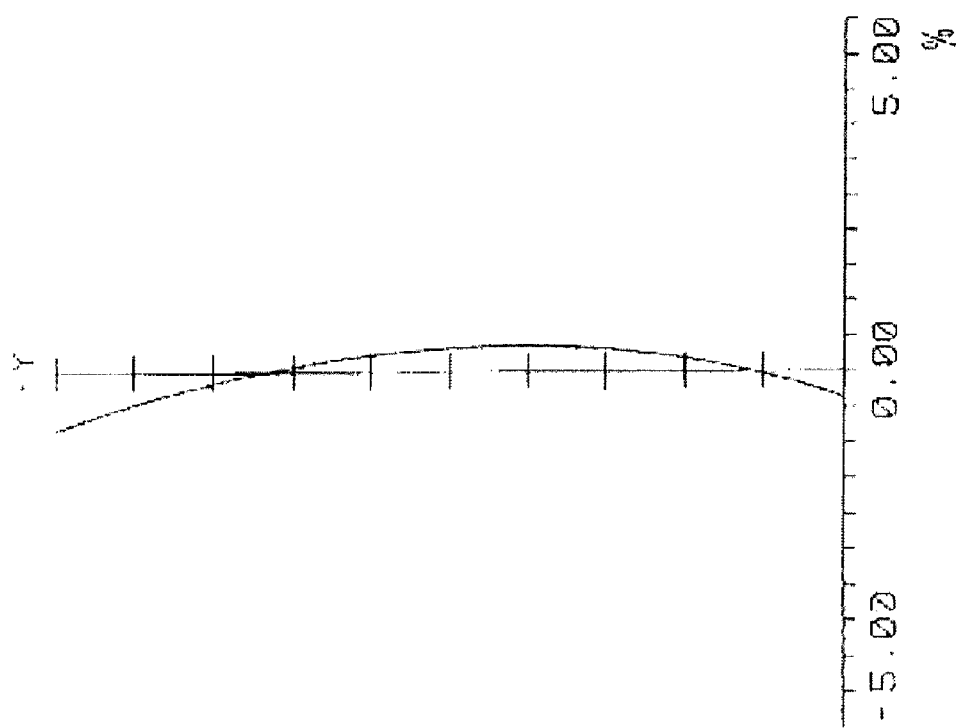
FIG. 10 is a curve distribution diagram of linearity difference of the optical lens provided in the second embodiment of the present invention.
Figure 11:
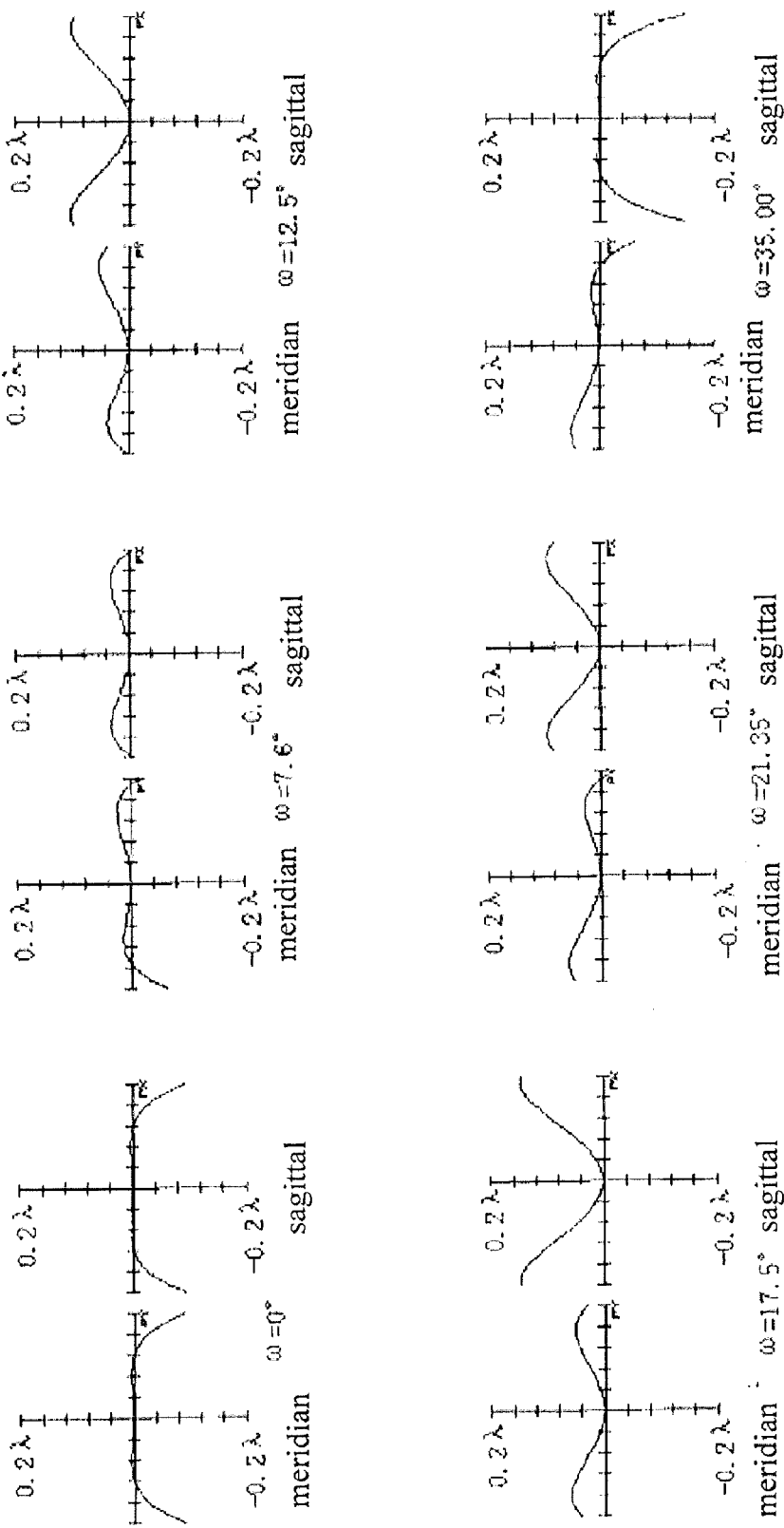
FIG. 11 is a curve distribution diagram of light path difference of the optical lens provided in the second embodiment of the present invention when the field of view thereof is respectively 0, 0.3, 0.5, 0.7, 0.85 and 0.1.
Figure 12:
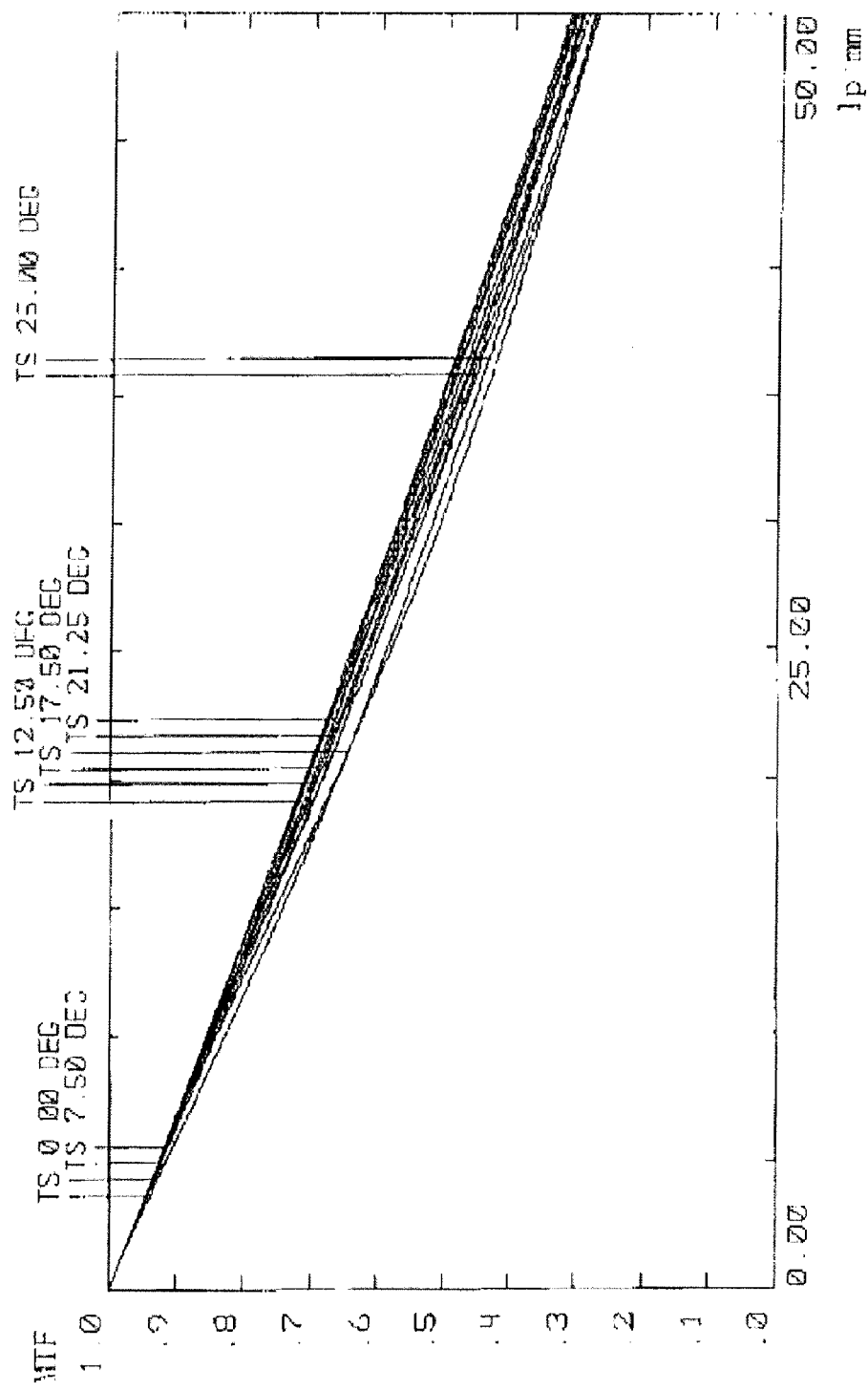
FIG. 12 is an MTF distribution diagram of the optical transfer function of the optical lens provided in the second embodiment of the present invention.

FIG. 8 is a light trace diagram of the second embodiment, illustrating the layout of the lens of the product of this embodiment. FIG. 9 is a distribution diagram of astigmatism, curvature of field and distortion (A is the distribution diagram of the astigmatism and the curvature of field, B is the distribution diagram of the distribution), it is seen that the astigmatism and the curvature of field of the system of this embodiment are very well corrected, as shown in the figure. FIG. 10 is a curve distribution diagram of linearity difference, linear error of the system is at maximum within ±0.5%, thus the equation of the object-image relationship of the F-theta lens is relatively better realized. FIG. 11 is a light path difference diagram when the field of view is respectively 0, 0.3, 0.5, 0.7, 0.85 and 0.1, the light path difference is at maximum not larger than ±0.2λ, showing that the aberration of the system of this embodiment is relatively better corrected. FIG. 12 is an MTF distribution diagram of the optical transfer function. It is shown from the figure that: the MTF value of each field of view is relatively consistent, showing that the imaging over all field of view is uniform.

What is claimed is:

1. A fixed focal length optical lens system, comprising;
a lens group and a diaphragm,
wherein: said diaphragm is located in front of said lens group, said lens group comprising three lenses, respectively the first, the second and the third lens, which are sequentially arranged as a "negative-positive-positive" separated focal power system, said first lens is a double concave negative lens, said second lens is a positive meniscus lens, and said third lens is a double convex positive lens, wherein a concave surface of said second lens faces towards said diaphragm and a convex surface of said second lens faces away form said diaphragm, and a focal length of the entire optical system is f, focal lengths of the first, the second and the third lens are respectively f1, f2, and f3, and the ratio between the focal length of each lens and the focal length f of the entire optical system satisfies the following requirement:

$-0.7 < f1/f < -0.5$ $1.0 < f2/f < 1.3$ $0.8 < f3/f < 1.0$, and the first lens has a greater thickness than the second and third lenses.

2. The fixed focal length optical lens system according to claim 1, wherein: f1/f is −0.62, f2/f1 is 1.11, and f3/f1 is 0.92.

3. The fixed focal length optical lens system according to claim 1, wherein: the distance between said first lens and said diaphragm is 25-60 mm.

4. The fixed focal length optical lens system according to claim 1, wherein: the thickness of said first lens is 30 mm.

* * * * *